Sept. 12, 1944.　　　　S. I. BOUSMAN　　　　2,357,872
DIAPHRAGM PUMP
Filed Sept. 17, 1943　　　3 Sheets-Sheet 1

INVENTOR,
SAMUEL I. BOUSMAN.
BY Charles M. Fryer
ATTORNEY.

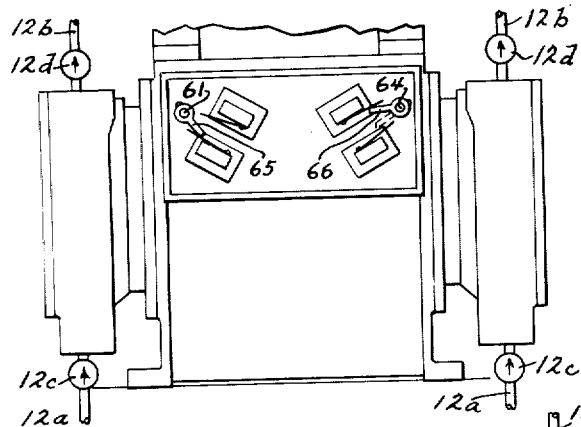
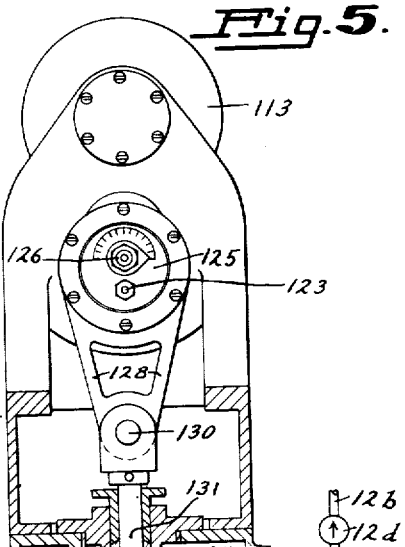
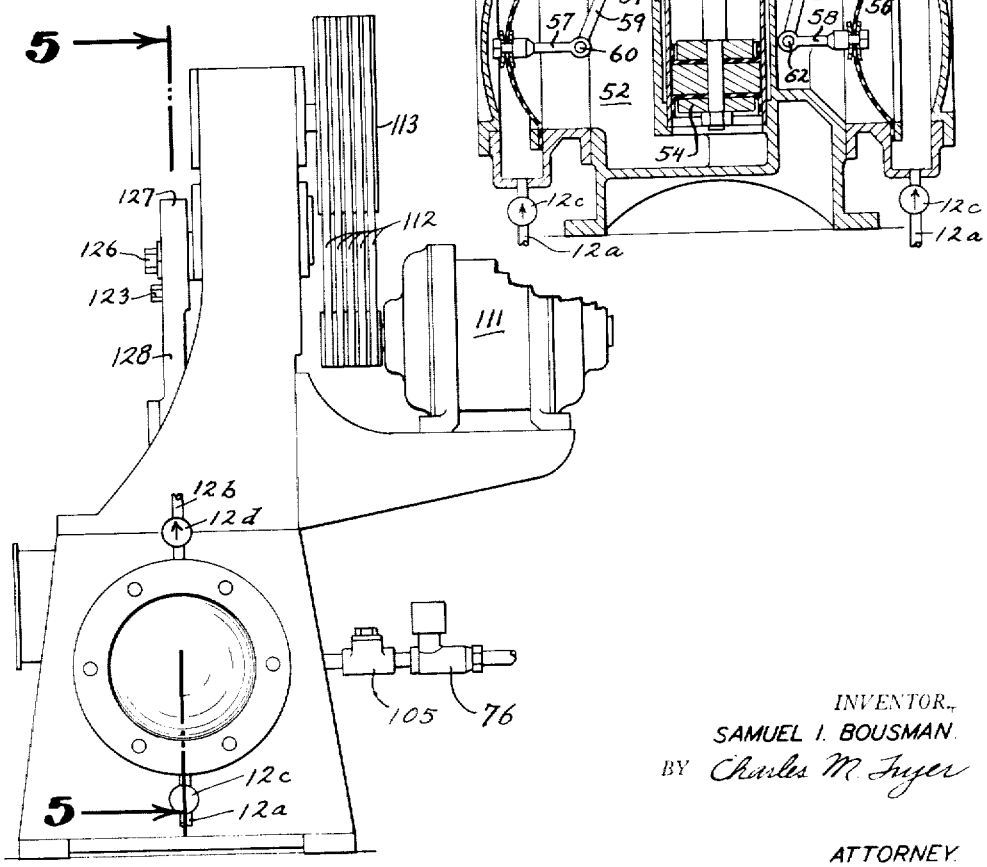

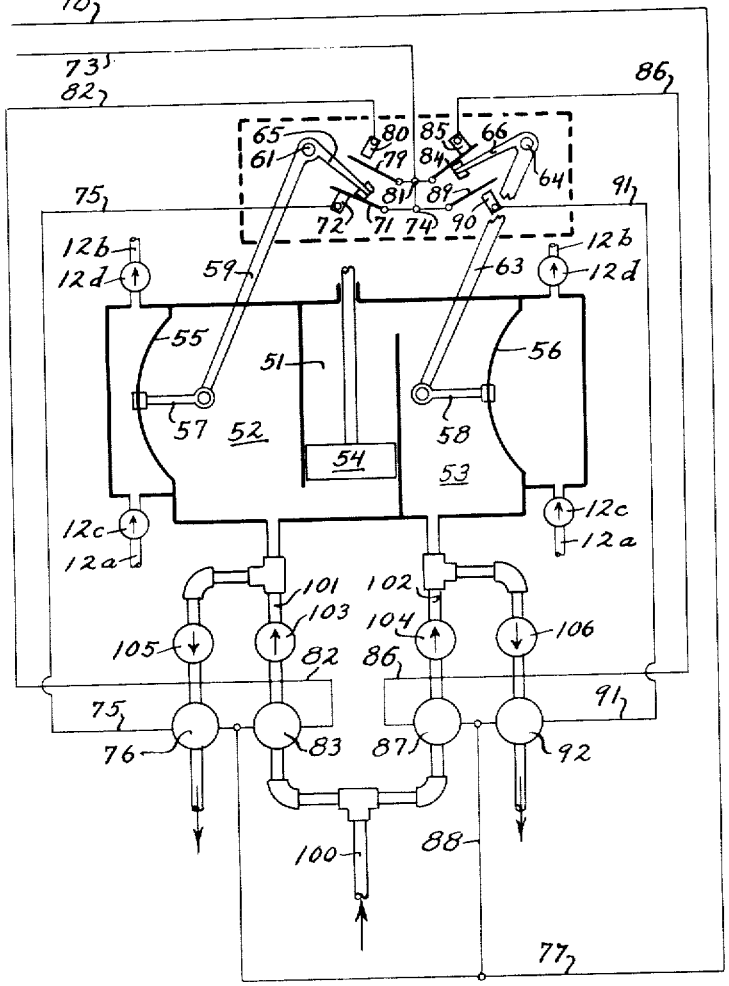

Patented Sept. 12, 1944

2,357,872

UNITED STATES PATENT OFFICE 2,357,872

DIAPHRAGM PUMP

Samuel I. Bousman, Berkeley, Calif., assignor to Western Machinery Company, San Francisco, Calif., a corporation of Utah Application September 17, 1943, Serial No. 502,786

5 Claims. (Cl. 103—44)

This invention relates to diaphragm pumps and particularly to maintaining the diaphragm intact and making it function with maximum efficiency, regardless of whether the pump is of the single action or multiple action type.

Too much actuating liquid in the diaphragm chamber may cause rupture of the diaphragm by stretching it too much, and too little may result in decreased output of the pump. Leakages generally occur to the outside of the system around the connecting rod, or at various valves, bolted joints or other pipe connections or fittings used. There generally is also leakage from one side of the piston to the other if the pump be of the double action type. Since it is desirable to have and maintain the right amount of actuating liquid in each diaphragm chamber so that the diaphragm will not be damaged and will pump continuously with maximum efficiency, the problem arises of adding actuating liquid to or removing it from the diaphragm chamber as the amount of liquid therein is respectively too little or too great.

Objects of this invention are to prevent damage to the diaphragm; to control the volume of the actuating liquid in the diaphragm chamber; to maintain such volume practically constant; to cause the proper amount of liquid to flow out of or into such chamber as soon as there is substantially too much or too little, respectively, therein; to control such flow of liquid with respect to a diaphragm chamber; to have it independent of any other diaphragm chamber or of the conditions existing with respect thereto; to make the adjustment and maintenance of the correct volume of liquid in the diaphragm chamber automatic; to make the stroke of the actuating piston adjustable; to provide a visual indication of the movement of the diaphragm; and other objects will be apparent on reading this specification.

The above objects are attained by causing abnormal positioning of the diaphragm due to the presence of too great or too small a volume of actuating liquid to actuate mechanism which controls valves to cause the proper amount of liquid to enter or to leave the particular chamber, independently of and without necessarily disturbing any other diaphragm chamber. The diaphragm will assume an abnormal position in one direction if the volume of liquid be too great, and an abnormal position in the other direction if such volume be too small, and these abnormal positions, which are visually indicated, are the actuating means to cause liquid to leave or enter the diaphragm chamber, as the case may be.

On the accompanying drawings forming a part of this specification, and on which the different views are not necessarily drawn to the same scale, Fig. 1 is a vertical sectional view of a diaphragm pump having a single diaphragm;

Fig. 4 is a side elevation of a complete pump;

Fig. 5 is a vertical sectional view on the line 5—5 of Fig. 4 and showing a pump having two diaphragms;

Fig. 6 is an elevation of a detail; and

Fig. 7 is a diagram of a wiring system.

Figure 1:
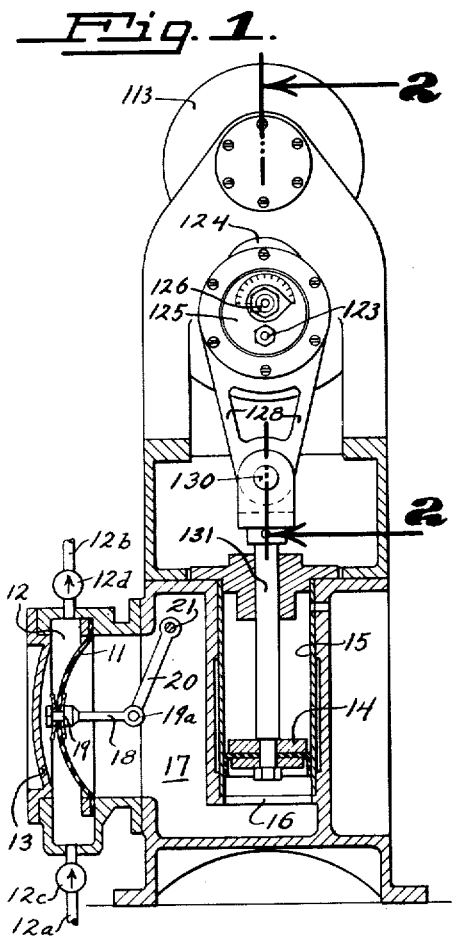
Figure 2:
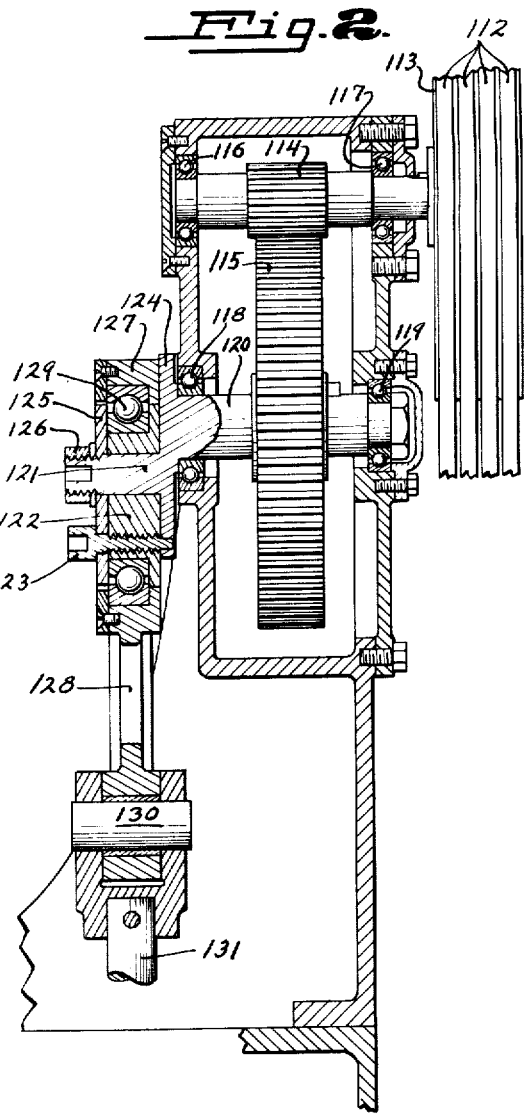
Fig. 2 is a sectional view on the line 2—2 of Fig. 1.

Referring to Fig. 1, a diaphragm 11 is suitably mounted to form a pump chamber 12 with the casing wall 13. An inlet 12a and an outlet 12b are connected to the chamber 12 to permit of the admission and expulsion thereinto and therefrom of the material to be pumped. The inlet and the outlet are each controlled by one way valves 12c and 12d respectively, the direction of free flow being indicated by the arrows thereon. A piston 14 reciprocates in the cylinder 15. The cylinder 15 has an open end 16 connected with the actuating liquid chamber 17 of the pump, in which is the water or other actuating liquid. As the piston is reciprocated, the actuating liquid which fills the chamber 17 and the cylinder below the piston is caused to move toward and away from the diaphragm by the reciprocatory movement of the piston. The motion of the piston is thus communicated to the diaphragm which by its reciprocatory movement pumps the fluid to be moved in the conventional manner.

Too much actuating liquid in the chamber 17 causes the diaphragm to be stretched too far to the left, and too little water in the chamber will cause the diaphragm to move too far to the right as seen on Fig. 1. Too great a movement of the diaphragm may cause damage thereto, and lack of actuating liquid may cause inefficient operation. With the right amount of liquid present in the chamber, the diaphragm will be made to reciprocate the proper amounts for the most effective operation and without causing damage other than ordinary wear. The volume of liquid in the chamber 17 ordinarily varies substantially during operation of the pump due to leakage and perhaps other causes, and to compensate for the change in volume, whether it be an increase or a decrease, means are provided to cause the right amount of water to flow out of or into the chamber, as the case may be. With this in view, a rigid stem 18 is connected with the diaphragm at 19 at one end of the chamber 18, while the other end thereof is connected at 19a with an arm 20 fixed to a shaft 21 which extends through and outside the casing, as seen on Fig. 3.

An arm 22 having a head 23 is fixed to the shaft 21 on the outside of the casing. The head 23 oscillates as the diaphragm reciprocates. The movement and position at any moment of the head is an indication of the movement and position of the diaphragm at that moment, so that a visual indication is given of the movement and position of the diaphragm. Abnormal movement or positioning of the diaphragm will result in abnormal movement or positioning of the head, which not only may be seen but it is also used to control the amount of liquid in the chamber 17.

Figure 3:
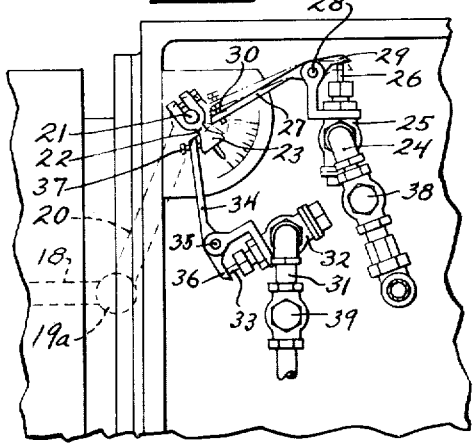
Fig. 3 is an elevation of a detail on an enlarged scale.

One way of accomplishing this is shown on Fig. 3. A pipe 24 leading into the chamber 17 is connected to a source of actuating liquid outside of the pump (not shown) and is controlled by a normally closed valve 25 having a stem 26. An arm 27 is pivoted at 28, the short end 29 of which bears upon the valve stem 26 as it is rotated. The other end of the arm is provided with an adjusting screw 30, which is contacted by the head 23 and moved thereby when the head swings too far to the right and upwardly as seen on Fig. 3. The resulting movement of the head is communicated to the valve stem 26 and thus causes the valve to open when there is too little water in the chamber. An outlet pipe 31 is connected to the chamber 17, and is controlled by a normally closed valve 32 having a stem 33. An arm 34, similar to the arm 27, is pivotally mounted at 35, the short end 36 of which bears upon the valve stem 33 as it is rotated. A set screw 37 on the arm 34 is likewise contacted and moved by the head 23 when the head swings too far to the left as seen on Fig. 3, this being caused by too great a movement of the diaphragm 11 to the left, as seen on Fig. 1. Such movement is due only to the presence of too much actuating liquid within the chamber, and the outlet valve is opened as soon as the amount of such liquid is too great. Check valves 38 and 39 may be provided respectively in the inlet pipe 24 and the outlet pipe 31, to permit of flow only in the right direction.

Since the inlet and outlet valves are self-closing, a stroke of the diaphragm too far to the left, as seen on Fig. 1, causes removal of actuating liquid from the chamber 17 while, and only while, the diaphragm is too far to the left, and a stroke too far to the right causes entry of actuating liquid into the chamber while, and only while, the diaphragm is too far to the right. The amount of liquid within the chamber is thus adjusted and maintained at the right amount, irrespective of any leakages or any other causes of changes in the volume of liquid within the chamber 17, and such control is independent of the control of the amount of actuating liquid for any other diaphragm. Compensation for changes in volume of the liquid in the chamber 17 due to changes in temperature is thus automatic.

The head 23 may operate other types of controls than those shown on Fig. 3, which may be mechanical or electrical, and any type of control may be applied individually to one or any other number of diaphragm pumps whether they pump either independently of or in combination with each other. A double action pump is shown on Fig. 5 having electrical controls, but it is to be understood that either the mechanical or the electrical, or any other control, can be applied to a single action, a double action, or any other type of diaphragm pump, since the control of actuating fluid for any diaphragm is independent of that of the fluid for all other diaphragms. Referring to Fig. 5, the cylinder 51 is open at both ends, the lower end connecting with the chamber 52 and the upper end with the chamber 53. As the piston 54 descends, as seen on such figure, the effect on the actuating liquid within the chambers 52 and 53 is to press the diaphragm 55 to the left and to draw the diaphragm 56 in the same direction to assume the positions shown on Fig. 5. As the piston 54 rises it causes the water to reverse the movements of these diaphragms and to draw the diaphragm 55 and press the diaphragm 56 to the right, as is conventional in double action diaphragm pumps. The diaphragm 55 is provided with a stem 57 and the diaphragm 56 is likewise provided with a stem 58, similar to the stem 18. The stem 57 is rotatably connected at its end to an arm 59 at 60, the arm being fixed to a shaft 61 passing through the casing. The stem 58 is similarly connected at 62 to an arm 63, which is fixed to the shaft 64 which passes through the casing. Attached to the shafts 61 and 64 are arms 65 and 66 respectively, as seen on Fig. 7. The arms 59 and 63 should be entirely within the pump casing as shown on Fig. 5, but they are shown diagrammatically on Fig. 7 with one end of each away from the casing in order to illustrate the control means which they actuate. The arms 65 and 66 will swing as the respective diaphragms move, and on any abnormal movement of either diaphragm due to the presence of too much or too little actuating liquid in the respective actuating chambers, the respective arms will close an electrical circuit which will cause water to exit from or enter the respective diaphragm chamber as the case may be, independently of the other diaphragm chamber.

Referring to Fig. 7, the arm 65, upon too great a pressure stroke of the diaphragm 55, that is to the left as seen on this figure, will cause the movable switch member 71 to contact the fixed switch member 72. This closes a circuit comprising the leg 73 of the power line, the connection 74, the switch 71, 72, the lead 75 to the solenoid operated valve 76, and the lead 77 back to the other leg 78 of the power line. The solenoid operated valve 76 is operated by the current to open a valve in the exit line connected to the chamber 52. If the diaphragm 55 moves too far to the right on the suction stroke, the arm 65 will move the movable contact 79 into contact with the fixed contact 80, thus closing the circuit including the leg 73 of the power line, the connection 81, the switch 79, 80, the lead 82, the solenoid operated switch 83, the lead 77 and the other leg 78 of the power line. On movement of the diaphragm 56 too far to the left on its suction stroke, the arm 66 moves the movable contact 84 into contact with the fixed contact 85, thus closing a circuit including the leg 73 of the power line, the connection 81, the switch 84, 85, the lead 86, the solenoid operated switch 87, the lead 88, the lead 77, and the other leg 78 of the power line. On movement of the diaphragm 56 too far to the right on the pressure stroke, the arm 66 moves the movable contact 89 into contact with the fixed contact 90, thus closing the circuit including the leg 73 of the power line, the connection 74, the switch 89, 90, the lead 91, the solenoid control valve 92, the leads 88 and 77, and the other leg 78 of the power line. A pipe 100 is connected to a source of supply of the actuating liquid, the pipe branching into the pipe 101 connecting with the chamber 52 and the pipe 102 connecting with the chamber 53. Opening the valve 83 permits actuating liquid to flow into the chamber 52 through the one-way valve 103, and opening the valve 87 permits the liquid to flow through the one-way valve 104 into the chamber 53. Opening the valve 76 permits the liquid to flow through the one-way valve 105 out of the chamber 52, and opening the valve 92 permits its flow through the one-way valve 106 out of the chamber 53. The valves 76, 83, 87 and 92 are normally closed and are opened on closing of the respective circuits. The valves 76 and 83 are never both open at the same time, and the same is true of the valves 87 and 92, so that actuating liquid cannot be wasted from the source of supply. The arrows on the check valves indicate the direction of free flow and water cannot flow through them in the opposite direction.

Whether the inlet and outlet valves are mechanically or electrically controlled, the control of the volume of actuating liquid in each diaphragm chamber is completely automatic and independent of the control of or of conditions existing in any other diaphragm chamber, so that the control of the volume of the liquid in each chamber is related only to the conditions existing in the particular chamber. If too great a volume of liquid is present, it will be ejected from the chamber on each pressure stroke until the volume has been brought down to normal. If too little liquid is present, it will be caused to enter the diaphragm chamber on each suction stroke until the right amount is present therein. Since it is the volume of the actuating liquid which affects the movement of the diaphragm in either direction, volume changes thereof due to changes in temperature will be compensated. Compensation will be automatic, whatever the cause of the abnormal volume of liquid present in the diaphragm chamber.

The moving arms which cause the volume control means to operate may be caused to move adjacent to a scale and thereby indicate the position of the respective diaphragm throughout its movement so that a visual indication may be given of the correctness of the functioning of the respective diaphragm. An example of such scale is shown on Fig. 3.

Means are provided to adjust the stroke of the piston which reciprocates the actuating liquid. A motor 111, Fig. 4, through belts 112 and pulley 113, causes rotation of the pinion 114 which in turn rotates a gear 115, both the pinion and gear being mounted on ball bearings 116, 117, and 118, 119, respectively. Attached to the shaft 120 of the gear 115 is a crank pin 121 upon which is eccentrically mounted a disc 122. This disc is adjustably mounted for rotation upon the crank and may be held fixed at any adjusted position thereon by the adjusting pin or screw 123 which passes through an opening in the disc and into the selected one of a series of openings in the back plate 124 connected to the crank pin. A front plate 125 holds the disc on the crank pin and in turn is held by the nut 126 on the end of the crank pin. The end 127 of the crank rod 128 surrounds the circular periphery of the eccentric disc 122 with a ball bearing 129 therebetween. The other end of the crank rod is pivotally connected at 130 to the piston rod 131, which actuates the piston 14. The length of the stroke of the piston 14 can thus be adjusted by rotating the eccentrically mounted disc 122 on the crank pin. The adjustment of the length of stroke of the piston is important with respect to maintaining the diaphragm intact. It will be stretched, and strained or damaged, if the piston stroke is too long; and on the other hand, the diaphragm will not function properly if the piston stroke is too short. Hence the combination of the adjustment of the piston stroke with the control of the volume of actuating fluid provides for maximum efficiency of operation without damage to the diaphragm.

Various features referred to for the purpose of illustrating and describing the invention may be varied without departing from the spirit thereof.

I claim:

1. A diaphragm pump comprising a casing, a diaphragm in said casing and forming therewith a space for material to be pumped and a chamber for actuating liquid, a cylinder connected to said chamber, a piston in said cylinder, a source of activating liquid independent of that in said pump, means automatically operable to remove actuating liquid from said chamber to a point independent of said pump when too large a volume of said liquid is in said chamber, means automatically operable to add to the volume of actuating liquid in said chamber from said source when too small a volume thereof is in said chamber, said aforementioned means including an inlet valve and an outlet valve both outside the casing and operable through a member connected to the diaphragm for movement therewith and which is located outside the casing manually operable means to adjust the length of stroke of said piston, and means cooperable with such member to indicate visually the movement of said diaphragm.

2. The combination with a diaphragm pump having a casing, a diaphragm in the casing, and a piston spaced from the diaphragm, the space between the piston and the diaphragm providing a chamber for liquid to move the diaphragm back and forth upon working of the piston; of means for automatically controlling the limits of movement of the diaphragm by regulation of the quantity of liquid in the chamber comprising conduit means connected to the chamber and to a source of liquid outside of the pump, valve mechanism outside of the casing and associated with such conduit means for controlling flow of liquid into the chamber, another valve mechanism outside of the casing for controlling flow of liquid out of the chamber, and control mechanism connected to and movable by the diaphragm and extending through the casing to a position outside thereof having a member outside the casing movable to control the valve mechanisms.

3. The combination with a diaphragm pump having a casing, a diaphragm in the casing, and a piston spaced from the diaphragm, the space between the piston and the diaphragm providing a chamber for liquid to move the diaphragm back and forth upon working of the piston; of means for automatically controlling the limits of movement of the diaphragm by regulation of the quantity of liquid in the chamber comprising conduit means connected to the chamber and to a source of liquid outside of the pump, valve mechanism outside of the casing and associated with such conduit means for controlling flow of liquid into the chamber, another valve mechanism outside of the casing for controlling flow of liquid out of the chamber, and control mechanism connected to and movable by the diaphragm and extending through the casing to a position outside thereof to control the valve mechanisms, the control mechanism including a shaft journalled in a wall of the casing, an arm member secured to the shaft outside the casing so as to oscillate as the shaft is turned, and a linkage connection inside the chamber between the shaft and the diaphragm.

4. The combination with a diaphragm pump having a casing, a diaphragm in the casing, and a piston spaced from the diaphragm, the space between the piston and the diaphragm providing a chamber for liquid to move the diaphragm back and forth upon working of the piston; of means for automatically controlling the limits of movement of the diaphragm by regulation of the quantity of liquid in the chamber comprising conduit means connected to the chamber and to a source of liquid outside of the pump, a solenoid actuatable valve mechanism outside of the casing and associated with such conduit means for controlling flow of liquid into the chamber, another solenoid actuatable valve mechanism outside of the casing for controlling flow of liquid out of the chamber, and control mechanism connected to and movable by the diaphragm and extending through the casing to a position outside thereof having a member outside the casing movable to control the valve mechanisms by opening and closing of electrical circuit means connected to the solenoids.

5. The combination with a double action diaphragm pump having a casing, a pair of diaphragms in the casing, and a piston between and spaced from the diaphragms, the space between the piston and each diaphragm providing a chamber for liquid to move such diaphragm back and forth upon working of the piston; of means for automatically controlling the limits of movement of the diaphragms by regulation of the quantity of liquid in each chamber comprising conduit means connected to each chamber and to a source of liquid outside of the pump, a pair of valve mechanisms outside of the casing one of which is associated with a conduit means for controlling flow of liquid into one of the chambers and the other of which is associated with such chamber for controlling flow of liquid out of the chamber, another pair of valve mechanisms outside of the casing one of which is associated with a conduit means for controlling flow of liquid into the other of such chambers and the other of which is associated with such chamber for controlling flow of liquid out of the chamber, and a control mechanism connected to and movable by each diaphragm and extending through the casing to a position outside thereof having a member outside the casing to control an associated pair of valve mechanisms.

SAMUEL I. BOUSMAN.

---

CERTIFICATE OF CORRECTION.

Patent No. 2,357,872. September 12, 1944.

SAMUEL I. BOUSMAN.

It is hereby certified that error appears in the printed specification of the above numbered patent requiring correction as follows: Page 2, first column, line 4, for the word "chamber" read --member--; and that the said Letters Patent should be read with this correction therein that the same may conform to the record of the case in the Patent Office.

Signed and sealed this 14th day of November, A. D. 1944.

Leslie Frazer (Seal) Acting Commissioner of Patents.

valve mechanism outside of the casing and associated with such conduit means for controlling flow of liquid into the chamber, another valve mechanism outside of the casing for controlling flow of liquid out of the chamber, and control mechanism connected to and movable by the diaphragm and extending through the casing to a position outside thereof to control the valve mechanisms, the control mechanism including a shaft journalled in a wall of the casing, an arm member secured to the shaft outside the casing so as to oscillate as the shaft is turned, and a linkage connection inside the chamber between the shaft and the diaphragm.

4. The combination with a diaphragm pump having a casing, a diaphragm in the casing, and a piston spaced from the diaphragm, the space between the piston and the diaphragm providing a chamber for liquid to move the diaphragm back and forth upon working of the piston; of means for automatically controlling the limits of movement of the diaphragm by regulation of the quantity of liquid in the chamber comprising conduit means connected to the chamber and to a source of liquid outside of the pump, a solenoid actuatable valve mechanism outside of the casing and associated with such conduit means for controlling flow of liquid into the chamber, another solenoid actuatable valve mechanism outside of the casing for controlling flow of liquid out of the chamber, and control mechanism connected to and movable by the diaphragm and extending through the casing to a position outside thereof having a member outside the casing movable to control the valve mechanisms by opening and closing of electrical circuit means connected to the solenoids.

5. The combination with a double action diaphragm pump having a casing, a pair of diaphragms in the casing, and a piston between and spaced from the diaphragms, the space between the piston and each diaphragm providing a chamber for liquid to move such diaphragm back and forth upon working of the piston; of means for automatically controlling the limits of movement of the diaphragms by regulation of the quantity of liquid in each chamber comprising conduit means connected to each chamber and to a source of liquid outside of the pump, a pair of valve mechanisms outside of the casing one of which is associated with a conduit means for controlling flow of liquid into one of the chambers and the other of which is associated with such chamber for controlling flow of liquid out of the chamber, another pair of valve mechanisms outside of the casing one of which is associated with a conduit means for controlling flow of liquid into the other of such chambers and the other of which is associated with such chamber for controlling flow of liquid out of the chamber, and a control mechanism connected to and movable by each diaphragm and extending through the casing to a position outside thereof having a member outside the casing to control an associated pair of valve mechanisms.

SAMUEL I. BOUSMAN.

CERTIFICATE OF CORRECTION.

Patent No. 2,357,872.   September 12, 1944.

SAMUEL I. BOUSMAN.

It is hereby certified that error appears in the printed specification of the above numbered patent requiring correction as follows: Page 2, first column, line 4, for the word "chamber" read --member--; and that the said Letters Patent should be read with this correction therein that the same may conform to the record of the case in the Patent Office.

Signed and sealed this 14th day of November, A. D. 1944.

Leslie Frazer (Seal)   Acting Commissioner of Patents.